Figure 1:
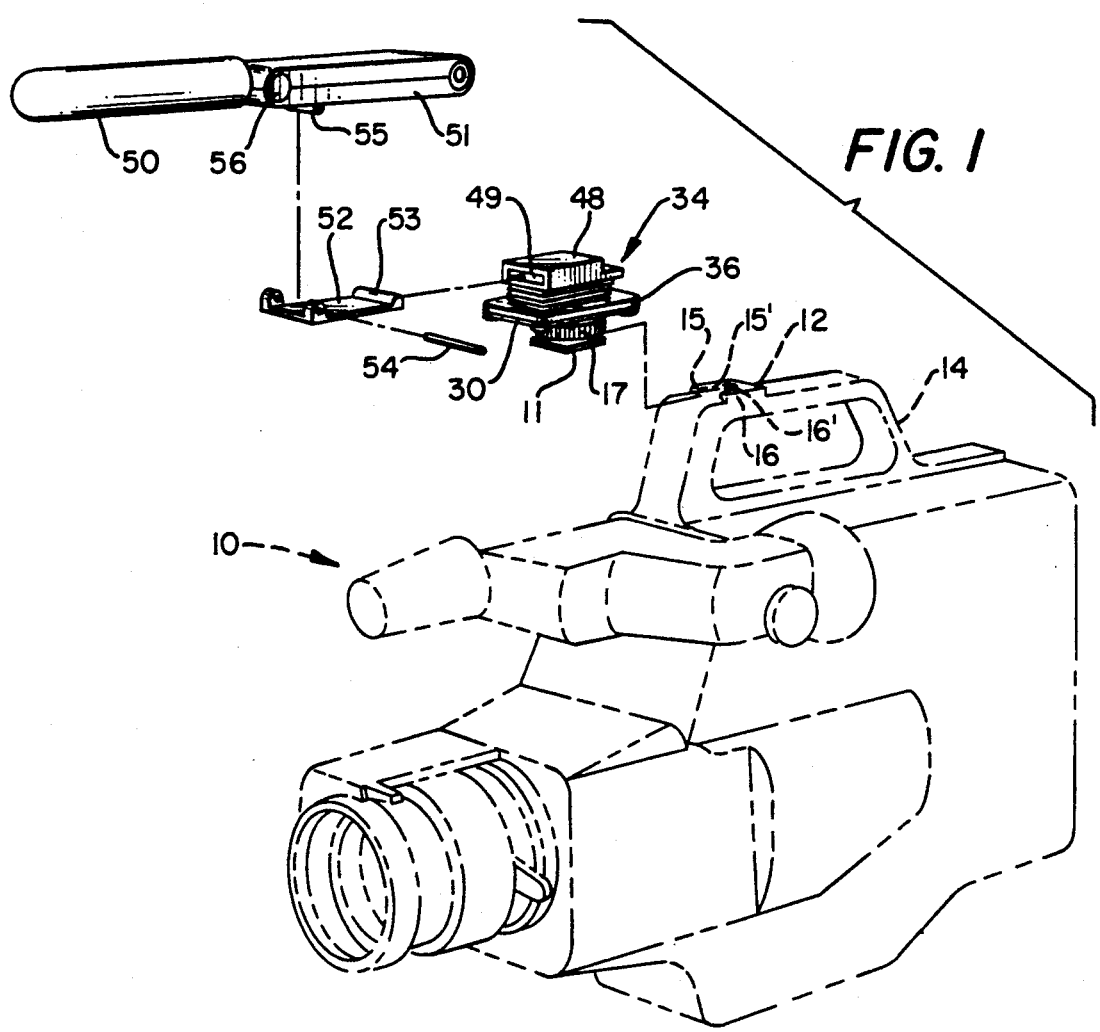

United States Patent [19]
Vance et al.

[11] Patent Number: 5,031,872
[45] Date of Patent: Jul. 16, 1991

[54] MICROPHONE NOISE FREQUENCY AND VIBRATION ABSORBING MOUNT

[75] Inventors: R. Edward Vance, Carrollton; Alfred J. Beckman, Plano, both of Tex.

[73] Assignee: Primo Microphones, Inc., McKinney, Tex.

[21] Appl. No.: 561,310

[22] Filed: Aug. 1, 1990

[51] Int. Cl.$^5$ ............................................. F16M 13/00
[52] U.S. Cl. .................... 248/562; 248/187; 381/169
[58] Field of Search ............ 248/634, 636, 562, 225.1; 267/122; 381/177, 169, 168; 403/335, 336, 321, 326

[56] References Cited

U.S. PATENT DOCUMENTS

| | | | |
|---|---|---|---|
| 755,403 | 3/1904 | Sipe | 248/187 X |
| 2,767,989 | 10/1956 | Luebbers | 248/187 X |
| 2,840,334 | 6/1958 | Cauthen | 248/187 |
| 3,573,401 | 4/1971 | Lininger | 381/169 X |
| 3,653,625 | 4/1972 | Plice | 381/169 X |
| 4,525,052 | 6/1985 | Kosugi | 248/187 X |
| 4,570,887 | 2/1986 | Banister | 248/187 |
| 4,791,674 | 12/1988 | Drever | 381/169 |
| 4,853,965 | 8/1989 | Blonski | 381/169 X |
| 4,929,973 | 5/1990 | Nakatani | 248/187 X |

FOREIGN PATENT DOCUMENTS

| | | | |
|---|---|---|---|
| 1148718 | 5/1963 | Fed. Rep. of Germany | 267/122 |
| 131850 | 10/1981 | Japan | 267/122 |

*Primary Examiner*—J. Franklin Foss
*Attorney, Agent, or Firm*—Warren H. Kintzinger

[57] ABSTRACT

A noise frequency and vibration absorbing mount is provided for microphones, particularly highly directional sound-gathering microphones, that, while achieving highly efficient reduction in the transmission of noise frequencies and vibrations, maintains directional alignment with the camcorder or camera, binoculars, rifle scope or whatever other equipment it may be mounted on regardless of directional change movements imposed on equipment mounting the microphone. The noise frequency, vibration absorbing and directional change stabilizing mount includes a hollow accordion pleated resilient material four walled enclosure fastened at its bottom to a mounting plate having two inside to outside small air flow dampening openings therein. The accordion pleated resilient material four walled enclosure is in rectangular elongate form in transverse planar cross section and is mold formed with a like density resilient material top connectable to a microphone and circuit case mounting connect member with the combined microphone (or sound and vibration sensitive device) case enclosed circuit and mounting structure having a combined weight in the two to five ounce range.

13 Claims, 3 Drawing Sheets

U.S. Patent

July 16, 1991

5,031,872

MICROPHONE NOISE FREQUENCY AND VIBRATION ABSORBING MOUNT

This invention relates in general to the mounting of noise and vibration sensitive devices, and more particularly, to a microphone noise frequency and vibration asorbing and direction following motion dampened mount.

There are various sound frequency and vibration sensitive light weight devices in the weight range of one to eight ounces that are mounted on objects subject to generating various sounds, vibrations and movements that should be cushioned and/or blocked from the vibration and sound sensitive devices. Camcorders or cameras have internal motors that generate sounds and there are switches that created noise and vibration and they are subject to movement in following frames of view being recorded. Vibration and sound sensitive devices are also subject to being mounted on binoculars, rifle scopes, surveying instruments, gyrostabilized platforms and other equipment where it is important to mount insulate the sensitive devices from the instruments or products they are mounted on.

It is therefore a major object of this invention to provide a noise frequency and vibration absorbing and dampening mount for light weight sound frequency and vibration absorbing devices mounted on objects subject to sound and vibration.

Another object is to combine resilient material and metered air passage dampening in a pleated resilient material air chamber mount structure.

A further object of this invention is to provide dampened movement response to bodily movements of objects mounting noise and vibration sensitive devices.

Still another object is to provide such a noise and vibration and bodily movement dampened response mounting for highly directional sound-gathering microphones mounted in camcorder structures.

Features of the invention useful in accomplishing the above objects include, in a microphone noise frequency and vibration absorbing dampening and blocking mount, a mount for microphones, particularly highly directional sound-gathering microphones, that while achieving highly efficient reduction in the transmission of noise frequencies and vibrations maintains directional alignment with the camcorder or camera, binoculars, rifle scope or whatever other equipment it may be mounted on regardless of directional change movements imposed on equipment mounting the microphone. The noise frequency, vibration absorbing and directional change stabilizing mount includes a hollow accordion pleated resilient material four walled enclosure fastened at its bottom to a mounting plate having two inside to outside small air flow dampening openings therein. The accordion pleated resilient material four walled enclosure is in rectangular elongate form in transverse planar cross section and is mold formed with a like density resilient material top connectable to a microphone and circuit case mounting connect member with the combined microphone (or sound and vibration sensitive device) case enclosed circuit and mounting structure having a combined weight in the two to five ounce range.

A specific embodiment representing what is presently regarded as the best mode of carrying out the invention is illustrated in the accompanying drawings.

Figure 2:
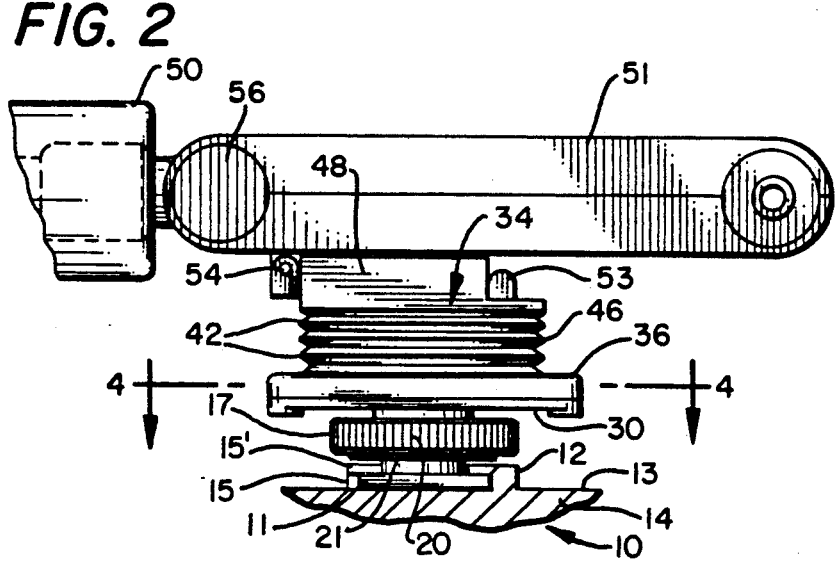
Figure 3:
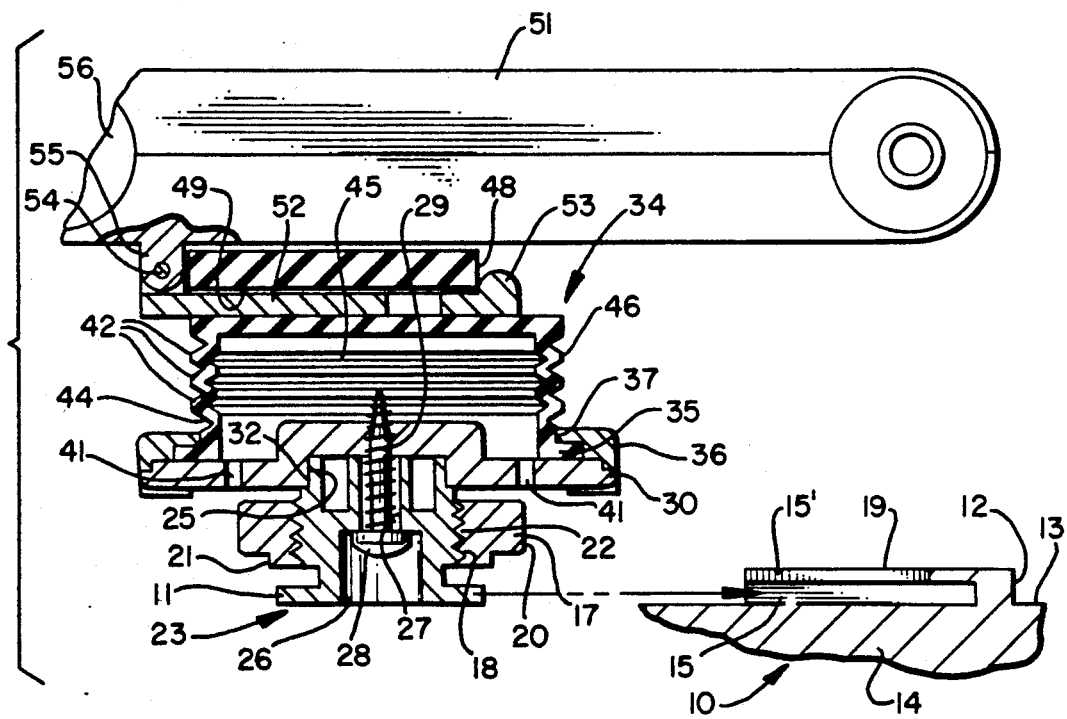
Figure 4:
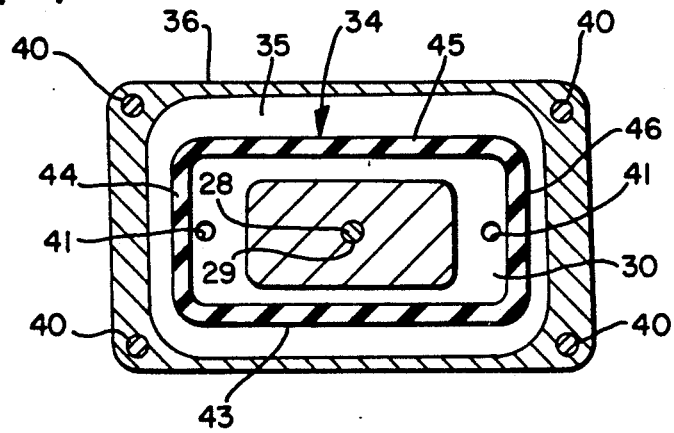
Figure 5A:
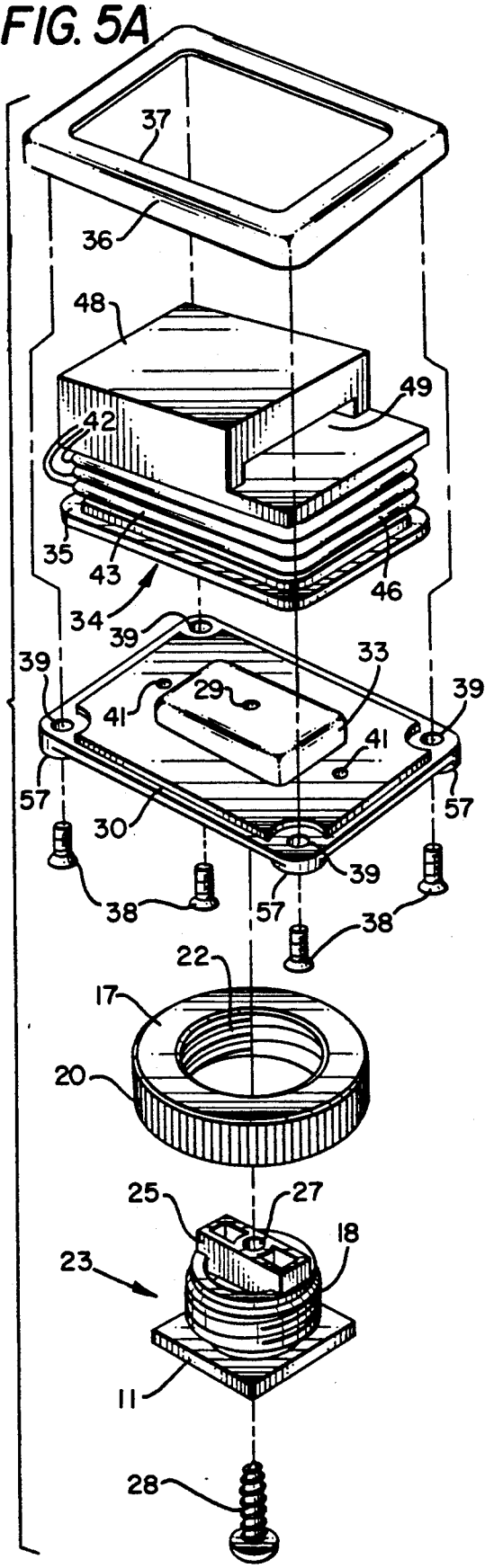
Figure 5B:
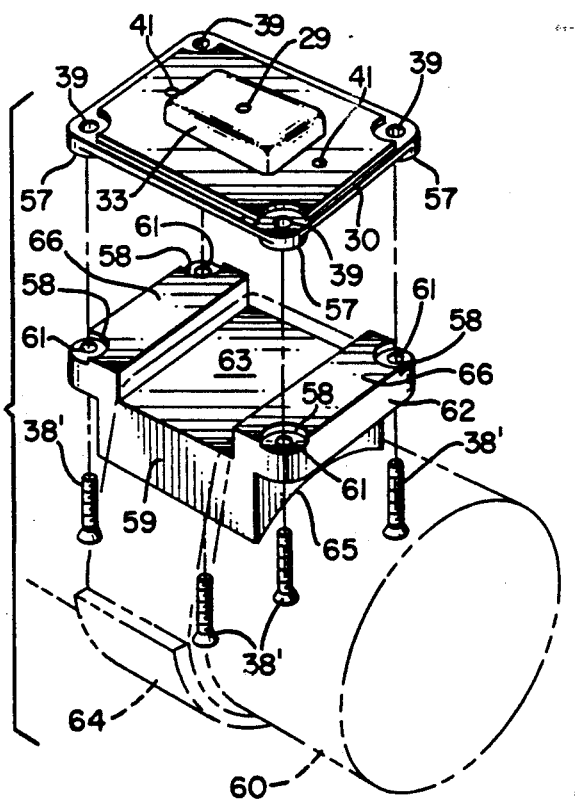

In the drawings:

FIG. 1 represents a perspective view of a highly directional sound-gathering microphone, camera in phantom and intervening noise frequency signal and vibration absorbing and dampening mount structure in partially exploded form;

FIG. 2, a partial side elevation view of the noise frequency signal and vibration absorbing and dampening mount structure interconnecting a camcorder camera and the microphone mounted thereon;

FIG. 3, an enlarged side elevation view like FIG. 2 with, however, the mounting structure broken away and sectioned;

FIG. 4, a plane section view taken along line 4—4 showing interior detail of the mounting structure flexible material mount enclosure and the bottom plate with enclosure to exterior air flow dampening holes therein; and, FIGS. 5A and 5B, an enlarged exploded perspective view of the sound, vibration, and motion dampening mount structure in detail, and a different mounting structure for cylindrical devices.

REFERRING TO THE DRAWINGS

The camcorder structure 10, shown in phantom in FIG. 1, is shown to have a "U" shaped, mount base 11 receiving, section 12 on the forward top 13 of handle 14. Opposite sides 15 and 16 of section 12 have inwardly turned lips 15' and 16' that aid in retaining the square shaped base 11 that is inserted in from the front of the "U" shaped base 11 receiving section and fixed in place therein with mount nut 17 tightened down on mount base threads 18 to the top 19 of section 12 (referring also to FIGS. 2 and 3). Mount nut 17 has an outer serrated annular periphery 20, bottom cylindrical projection 21 and internal threads 22 mating mount base threads 18. The square base 11 and mount base threads 18 are part of mount base member 23 having the square base 11 at the bottom, a cylindrical continuation with threads 18 and extending thereabove a rectangular mount interconnect projection 25. Mount base member 23 also has a bottom cylindrical opening 26 and thereabove a through opening 27 to accomodate interconnect screw 28 that extends into threaded engagement with a threaded opening 29 in mount enclosure bottom plate 30 to tighten the mount base member 23 to mount enclosure bottom plate 30 with the rectangular projection 31 of mount base member 23 received within the rectangular opening 32 within enclosure bottom plate 30 boss 33. Enclosure bottom plate 30 forms an enclosure with molded resilient material accordian pleated side rectangular member 34 having a bottom flange 35 clamped to the top of enclosure bottom plate 30 by rectangular clamping member 36 having center opening 37. Four corner screws 38 extend through corner openings 39 of plate 30 into threaded engagement with internally threaded openings 40 within the corners of clamping member 36. Mounting enclosure bottom plate 30 also includes two inside to outside small diameter air flow dampening openings 41 approximately one sixteenth inches in diameter therein that aid in the dampening of noise frequencies and vibrations imposed on the mount structure by camcorder structure 10.

The accordion pleated 42 resilient material four walled 43, 44, 45 and 46 member 34 is in rectangular elongate form in transverse planar cross section as an aid to resiliently, in a dampened motion following action, maintaining the alignment of the directional microphone 47 through bodily movements of the camcorder structure 10. The resilient material mold forming enclosure member 34 is a flexible non-porpous material such as Ethylene Propylene Dienemonomer (EPDM) with a forty degree hardness rating, or a rubber (or synthetic) material. The flexible material enclosure member 34 is mold formed with a like density resilient material thickened top 48 having a longitudinally oriented through opening 49 for connection to a microphone 50 and circuit case 51 mounting connect member 52. Connect member 52 has an enlarged inserted position retaining end 53 and pivot pin 54 interconnect structure 55, at the other end, connected to the forward bottom of circuit case 56 that, in turn, has a forward pivot 56 interconnect mounting connection with the rear of highly directional microphone 50.

The mounting enclosure bottom plate 30 is formed with depending corner bottom boss extensions 57, around the corner openings 39, that must be received in and accomodated by corner cut outs 58 in mount member 59 used in place of mount base member 23 for mounting of the microphone 50 (or other sound and vibration sensitive instrument) on a cylindrical scope 60, gun barrel, or cylinder of a field glass. With this mount member 59 screws 38' are longer than screws 38 in having to extend through corner openings 61 in opposite end flanges 62, the enclosure bottom plate openings 39 and on into internally threaded openings 40 within the corners of clamping member 36. Mount member 59 has a recessed center 63 through which mount holding belt 64 extends in fastening member 59 down with its rounded arcuate bottom 65 on the cylindrical member 60 it is mounted on. It is of interest to note that threaded opening 29 is open in this instance without a screw 28 therein and air flow dampening openings 41 are blocked from air flow by the upper surfaces 66 of opposite end flanges 62 so threaded opening 29 is in this instance functions as the inside to outside small diameter air flow dampening opening dampening noise frequencies and vibrations imposed on the mount structure by the cylindrical item it is mounted on. The mount holding belt 64 could be a holding strap of the hook and loop type such as "VELCRO" and that the mount member 59 can be a plastic member such as being molded from ABS plastic.

Whereas this invention has been described with respect to two embodiments thereof, it should be realized that various changes may be made without departing from the essential contributions to the art made by the teachings hereof.

We claim:

1. A noise frequency and vibration absorbing mount for sound and vibration sensitive devices mounted on sound frequency and vibration generating objects comprising: a hollow accordion pleated walled resilient material enclosure; noise frequency and vibration absorbing and dampening means in said mount; a mounting plate fastened to the bottom of said hollow accordion pleated walled resilient material enclosure as a combined bottom enclosure therefore and mount member interconnect; mount means fastened to the object generating sound frequency and vibration and fastened to said mounting plate; and said hollow accordion pleated walled resilient material enclosure being mold formed with a like density resilient material top shaped for connection to connect means of said sound and vibration sensitive devices; wherein a portion of said hollow accordion pleated walled material enclosure extends sufficiently far transversely to provide dampened motion following action in maintaining alignment of the mounted device in a combined mounted device and mount structure in an approximate weight range of two ounces to five ounces; said hollow accordion pleated walled material enclosure is in rectangular elongate form in transverse planar cross section with four sides as an aid to resiliently dampened motion following action maintaining direction alignment of the sound and vibration sensitive device through bodily directional change movements of the object generating sound frequencies and vibrations and subject to directional change movement; said enclosure includes inside to outside small cross sectional air flow dampening means; said inside to outside small cross sectional airflow dampening opening means is in said mounting plate; said mount means is a mount member having a recessed center between opposite end flanges having upper surfaces engaging the bottom of said mounting plate with connecting screws extended through said opposite end flanges and said mounting plate and into mount assembly clamp means.

2. The noise frequency and vibration absorbing mount of claim 1, wherein said small cross sectional air flow dampening opening means includes two inside to outside enclosure openings approximately one sixteenth of an inch in diameter.

3. The noise frequency and vibration absorbing mount of claim 1, wherein said mounting plate has a center opening as said inside to outside small cross sectional airflow dampening opening means in said mounting plate.

4. The noise frequency and vibration absorbing mount of claim 3, wherein said center opening is a threaded opening; and with said two inside to outside enclosure openings blocked from through flow of air by said upper surfaces of said opposite end flanges of said mount member having a recessed center between opposite end flanges.

5. The noise frequency and vibration absorbing mount of claim 4, wherein said mount member with a recessed center between opposite end flanges having a rounded bottom fitting a rounded object the mount member is mounted on.

6. The noise frequency and vibration absorbing mount of claim 5, wherein a mount holding belt used to fasten said mount member down is passed through said mount member recessed center and around said rounded object the mount member is mounted on.

7. The noise frequency and vibration absorbing mount of claim 6, wherein said mount holding belt is a belt strap of the hook and loop fastening type belt.

8. A noise frequency and vibration absorbing mount for sound and vibration sensitive devices mounted on sound frequency and vibration generating objects comprising: a hollow accordion pleated walled resilient material enclosure; noise frequency and vibration absorbing and dampening means in said mount; a mounting plate fastened to the bottom of said hollow accordion pleated walled resilient material enclosure as a combined bottom enclosure therefore and mount member interconnect; mount means fastened to the object generating sound frequency and vibration and fastened to said mounting plate; and said hollow accordion pleated walled resilient material enclosure being mold formed with a like density resilient material top shaped for connection to connect means of said sound and vibration sensitive devices; wherein a portion of said hollow accordion pleated walled material enclosure extends sufficiently far transversely to provide dampened motion following action in maintaining alignment of the mounted device in a combined mounted device and mount structure in an approximate weight range of two ounces to five ounces; said hollow accordion pleated walled material enclosure is in rectangular elongated form in transverse planar cross section with four sides as an aid to resiliently dampened motion following action maintaining directional alignment of the sound and vibration sensitive device through bodily directional change movements of the object generating sound frequencies and vibrations and subject to directional change movement; said enclosure includes inside to outside small cross sectional air flow dampening means; said inside to outside small cross sectional airflow dampening opening means is in said mounting plate; said mold formed resilient material top includes a front to rear through opening sized to receive a connect member connected to the device mounted by the noise frequency and vibration mount; and the resilient material of said mount is Ethylene Propylene Dienemonomer with a hardness rating in the thirty to fifty degree hardness rating range.

9. A noise frequency and vibration absorbing mount for sound and vibration sensitive devices mounted on sound frequency and vibration generating objects comprising: a hollow accordion pleated walled resilient material enclosure; noise frequency and vibration absorbing and dampening means in said mount; a mounting plate fastened to the bottom of said hollow pleated walled resilient material enclosure as a combined bottom enclosure therefore and mount member interconnect; mount means fastened to the object generating sound frequency and vibration and fastened to said mounting plate; and said hollow accordion pleated walled resilient material enclosure being mold formed with a like density resilient material top shaped for connection to connect means of said sound and vibration sensitive devices; wherein a portion of said hollow accordion pleated walled material enclosure extends sufficiently far transversely to provide dampened motion following action in maintaining alignment of the mounted device in a combined mounted device and mount structure in an approximate weight range of two ounces to five ounces; said hollow accordion pleated walled material enclosure is in rectangular elongate form in transverse planar cross section with four sides as an aid to resiliently dampened motion following action maintaining direction alignment of the sound and vibration sensitive device through bodily directional change movements of the object generating sound frequency and vibrations and subject to directional change movement; said enclosure includes inside to outside small cross sectional air flow dampening opening means; said inside to outside small cross sectional airflow dampening opening means is in said mounting plate; said mold formed resilient material top includes a front to rear through opening sized to receive a connect member connected to the device mounted by the noise frequency and vibration mount; and said mount interconnects the camera and the microphone of a camcorder.

10. A noise frequency and vibration absorbing mount for sound and vibration sensitive devices mounted on sound frequency and vibration generating objects comprising; a hollow accordion pleated walled resilient material enclosure; noise frequency and vibration absorbing and dampening means in said mount; a mounting plate fastened to the bottom of said hollow accordion pleated walled resilient material enclosure as a combined bottom enclosure therefore and mount member interconnect; mount means fastened to the object generating sound frequency and vibration and fastened to said mounting plate; and said hollow accordion pleated walled resilient material enclosure being mold formed with a like density resilient material top shaped for connection to connect means of said sound and vibration sensitive devices; wherein a portion of said hollow accordion pleated walled material enclosure extends sufficiently far transversely to provide dampened motion following action in maintaining alignment of the mounted device in a combined mounted device and mount structure in an approximate weight range of two ounces to five ounces; said hollow accordion pleated walled material enclosure is in rectangular elongate form in transverse planar cross section with four sides as an aid to resiliently dampened motion following action maintaining directional alignment of the sound and vibration sensitive device through bodily directional change movements of the object generating sound frequencies and vibrations and subject to directional change movement; said enclosure includes inside to outside small cross sectional air flow dampening opening means; said inside to outside small cross sectional airflow dampening opening means is in said mounting plate; said mount includes a mount base member with a rectangular bottom having a cylindrical extension with a threaded section mounting a base clamping nut; and a "U" shaped section on the top of the object receiving the rectangular bottom of said mount base member; inwardly turned lips st the tops of the opposite sides of said "U" shaped section overlying opposite side edges of said mount base member rectangular bottom; and said base clamping unit threadable downwardly on said threaded section to clamp the rectangular bottom in place in said "U" shaped section.

11. The noise frequency and vibration absorbing mount of claim 10, wherein said "U" shaped section is located on the forward top of a top handle of a camcorder camera.

12. The noise frequency and vibration absorbing mount of claim 10, wherein said mount base member has a bottom cylindrical opening and thereabove a through opening accomodating an interconnect screw; and said interconnect screw threaded into a threaded center opening in said mounting plate to tighten connect the mount base member to the mount enclosure bottom plate.

13. The noise frequency and vibration absorbing mount of claim 12, wherein said threaded center opening in said mounting plate is in another mount structure an inside to outside small cross sectional airflow dampening opening means.

* * * * *